W. R. CLARK.
SAFETY CRANK FOR EXPLOSION ENGINES.
APPLICATION FILED DEC. 10, 1910.
1,020,799.
Patented Mar. 19, 1912.
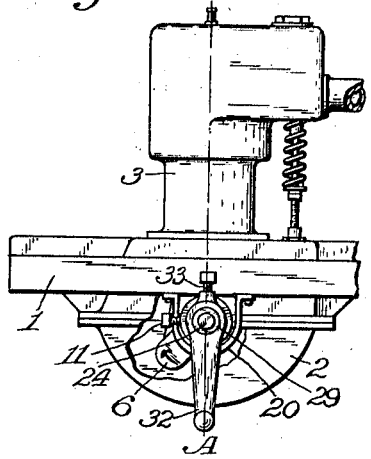
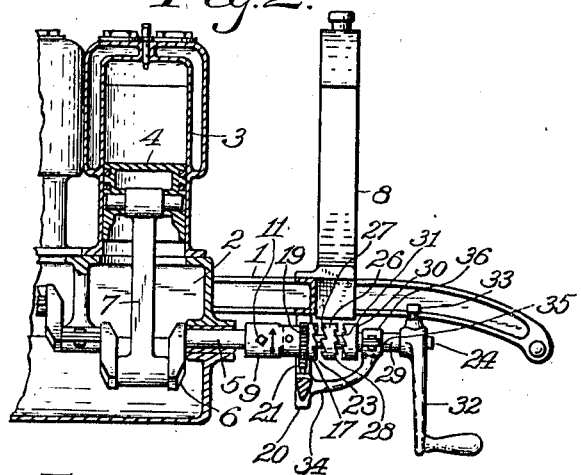
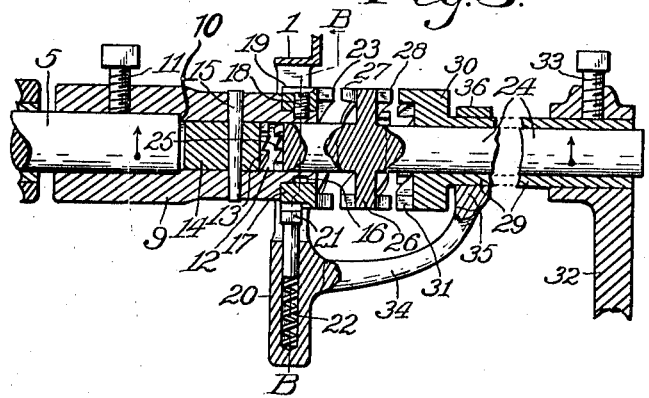
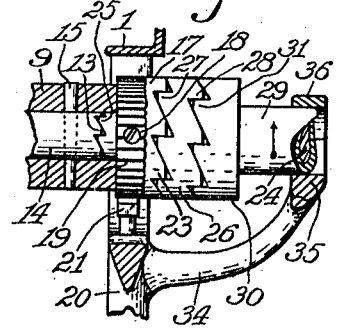
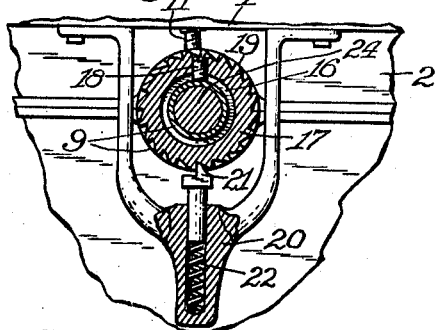
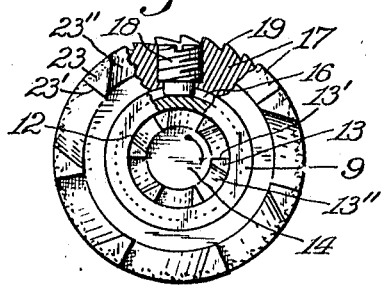
WITNESSES:
J. H. Gardner.
K. R. Woddell.
INVENTOR:
William R. Clark,
BY
E. T. Silvius,
ATTORNEY.

UNITED STATES PATENT OFFICE.

WILLIAM R. CLARK, OF MUNCIE, INDIANA.

SAFETY-CRANK FOR EXPLOSION-ENGINES.

1,020,799.

Specification of Letters Patent.   Patented Mar. 19, 1912.

Application filed December 10, 1910. Serial No. 596,571.

*To all whom it may concern:*

Be it known that I, WILLIAM R. CLARK, a citizen of the United States, residing at Muncie, in the county of Delaware and State of Indiana, have invented a new and useful Safety-Crank for Explosion-Engines, of which the following is a specification, reference being had to the accompanying drawings and to the letters and figures of reference marked thereon.

This invention relates to apparatus for starting or "cranking" explosion engines, especially the compression type of automobile engines, and the invention has reference more particularly to means, associated with hand cranking apparatus, designed to disconnect the hand crank from the crank shaft of the engine after starting, especially in case the engine starts in reverse to normal direction, or "kicks back", when an effort is made to start the engine.

The object of the invention is to provide improved cranking apparatus for explosion engines that will enable the starting to be accomplished by hand without risk of injury to the operator, in case an engine starts backward while an effort is being made to start it for normal operation; a further object being to provide a safety hand crank of simple construction that will be adapted to be used without liability to injure the operator when the engine starts promptly in the proper direction with the hand crank connected with and urging the crank shaft of the engine forward.

The invention consists in a hand crank and devices for coupling it temporarily with the crank shaft of an engine and provided with an improved automatic coupling breaker adapted to uncouple the hand crank from the crank shaft when the latter starts backward; the apparatus comprising also an improved automatic main throw-off device for enabling the engine to proceed when started in normal direction without carrying the hand crank with it, and an improved auxiliary throw-off device adapted to perform the function of the main throw-off device in case the main device sticks fast or fails to properly operate.

The invention consists also specifically in the novel parts, and combinations and arrangements of parts, as hereinafter particularly described and claimed.

Referring to the drawings, Figure 1 is a fragmentary end elevation of an explosion engine with which the invention is connected; Fig. 2, a fragmentary sectional elevation of the engine and the invention connected therewith approximately on the line A A in Fig. 1; Fig. 3, a sectional view of the invention as preferably constructed also on the line A A on an enlarged scale, with the hand crank uncoupled from the crank shaft; Fig. 4, a fragmentary sectional elevation showing the stub shaft of the hand crank coupled to the crank shaft of the engine; Fig. 5, a fragmentary sectional elevation approximately on the line B B in Fig. 3; and Fig. 6, an end view of parts of the invention which are permanently connected to the crank shaft of the engine.

Similar reference characters indicate corresponding elements or features of construction throughout the drawings.

The engine shown for the purpose of explaining the construction and function of the invention comprises a suitable frame 1, a crank box 2, one or more cylinders 3 in each of which is a piston 4, a shaft 5 being mounted in the crank box and having cranks 6 thereon, each crank being connected by a pitman 7 with a piston, a radiator 8 usually being mounted on the frame ahead of the engine.

The crank shaft 5 is provided with suitable devices with which other devices may be connected for coupling the hand crank to the crank shaft for starting operations, and in order to apply the invention to existing engines a coupling member 9 is provided which has a socket 10 therein to receive the forward end portion of the crank shaft, the member being secured permanently to the crank shaft preferably by a set-screw 11. The opposite or outer end portion of the member 9 has a smooth bore 12 therein for guiding one end of a stub shaft, and within the bore a suitable number of clutch teeth 13 of ratchet form are provided, the teeth having blunt or flattened extremities and squared faces 13′ facing rearward and inclined faces 13″ facing forward with respect to normal direction of movement. The teeth 13 preferably are formed on a separate core 14 pressed tightly into the bore 12 and further secured by a pin 15 or otherwise to the member 9, in order to facilitate accurate construction of the teeth. The bored end of the member 9 has an external groove 16 therein, and a coupling breaker is mounted on said bored end, being preferably constructed as an annular collar 17 rotative on said end portion and provided with a guide-pin 18 screwed through the collar and into the groove, the collar having ratchet teeth 19 on its periphery arranged with the squared sides thereof facing rearward. A bracket 20 is suitably secured to the frame 1 or otherwise, so as to be fixed adjacent to the collar, and it has a dog 21 mounted movably therein and pressed by a spring 22 into contact with the ratchet teeth 19, the dog being adapted to serve as a ratchet pawl and prevent backward movement of the collar while permitting the collar to move forward or in the normal direction of rotation of the crank shaft. The collar is provided with a suitable number of clutch teeth 23 on its outer face, the teeth being of the ratchet type flattened on their extremities and having squared sides 23' facing rearward and inclined sides 23'' facing forward. This construction of the teeth 23 enables the collar to be turned forward either with or independently of the member 9.

A suitable stub shaft 24 is provided which comprises a part of the coupling apparatus, and the inner end thereof has clutch teeth 25 thereon adapted to engage the teeth 13, the teeth 25 also having flattened extremities and are of the ratchet type with squared sides facing forward and inclined sides facing rearward. The stub shaft is guided rotatively in the bore 12 and may be moved longitudinally therein so that when it is turned to the right and pushed inward the crank shaft is turned to the right or normal direction of motion for starting the engine, and it will be clear that when the engine starts normally and turns the crank shaft faster than the stub shaft, the latter is forced outward by the teeth 13 so that the teeth become uncoupled from the teeth 25. The stub shaft has a cylindrical flange-like projection 26 thereon at a suitable distance from the inner end thereof, and the side of the projection toward the collar 17 has clutch teeth 27 thereon with flattened extremities, the teeth having squared sides facing forward and inclined sides facing rearward and adapted to engage the teeth 23 for turning the collar in normal direction, and it will be apparent that if the crank shaft turns forward and the stub shaft fails to become uncoupled therefrom entirely, the stub shaft on being slightly turned backward is caused by the teeth 23 and 27 to be moved outward so that the teeth 25 clear the teeth 13, it being seen that the teeth 23 and 27 are longer than the teeth 13 and 25. Also, it is clear that if the crank shaft 5 starts to turn backward it starts the stub shaft backward and causes the teeth 23 to force the teeth outward quickly so as to force the teeth 25 entirely away from the teeth 13, the collar 17 having the teeth 23 thereon being prevented from turning backward by the dog 21.

In order to guard against possible accidental injury to the operator when the engine starts in normal direction, in case the stub shaft sticks in its guide-bearing and does not become disconnected from the crank shaft, the projection 26 has teeth 28 on its outer side which are arranged oppositely to the teeth 27, the extremities of the teeth 28 being flattened, the said latter teeth having squared sides facing rearward and inclined sides facing forward, so that these teeth are like the teeth 23 on the collar 17. A sleeve 29 is mounted rotatively on the stub shaft 24 and is movable longitudinally thereon, and its inner end is provided with a flange 30 that has ratchet type teeth 31 on the side thereof that faces toward the projection 26, the teeth 31 having squared sides facing forward and inclined sides facing rearward, these teeth being like the teeth 27, so that when the sleeve is pushed inwardly the teeth 31 are brought into engagement with the teeth 28 for locking the sleeve to the stub shaft to turn the latter to the right for cranking the engine, and it is apparent that in case the stub shaft is carried to the right by the crank shaft while the sleeve is stopped the teeth 28 forces the teeth 31 outward so as to disconnect the sleeve from the stub shaft. A hand crank 32 is secured to the sleeve 29 preferably by a set-screw 33. A suitable arm 34 is supported fixedly in any desired manner, preferably on the bracket 20, and is provided with a bearing end 35 adapted to support the sleeve and thereby the outer end of the stub shaft and to be engaged by the flange 30, for limiting the outward movement of the sleeve on the stub shaft, the bearing end preferably being constructed as a journal-box and provided with a cap 36.

It will be understood that the collar 17 comprising the principal part of the coupling breaker may be prevented from turning backward by other means than the ratchet teeth 19 and dog 21.

In practical use the hand crank 32 is pushed toward the engine and turned to the right or in the direction that the engine normally runs until explosion occurs when, the crank shaft rotating faster than the stub shaft becomes automatically uncoupled from the hand crank through the intermediate means hereinbefore described, the particular functions of which having been particularly pointed out; and, in case the engine starts backward, or "kicks." backward, the stub shaft is automatically uncoupled from the crank shaft as above explained, so that the hand crank 32 can not be forced backward to any appreciable extent.

Having thus described the invention, what is claimed as new, is—

1. In a safety crank for explosion engines, the combination with a crank shaft provided with clutch teeth, of a stub shaft having clutch teeth thereon for detachably engaging the clutch teeth of the crank shaft, the stub shaft being rotatably supported and having a cylindrical flange-like projection thereon, a collar supported to rotate about the stub shaft, means for enabling the projection to rotate the collar in one direction, means for preventing the collar from rotating in the opposite direction, a sleeve rotatable on the stub shaft and having a flange thereon, means enabling the flange to rotate the projection in one direction, and a hand crank secured to the sleeve.

2. In a safety crank for explosion engines, the combination with a crank shaft, of a coupling member having a socket in one end portion receiving the end of the crank shaft, said member having an external groove extending circumferentially in the opposite end portion thereof, said opposite end portion having a smooth bore and provided therein with clutch teeth, a collar rotatably mounted on said opposite end portion and covering said groove, said collar having ratchet teeth on its periphery, a guide pin screwed into said collar and extending into said groove, clutch teeth on the outer face of said collar, a support fixed adjacent to said collar, a dog mounted movably in said support, a spring seated in said support and pressing said dog into engagement with said ratchet teeth, a stub shaft extending into said bore and having a flange-like projection thereon, clutch teeth on said projection to engage the clutch teeth on the face of said collar, clutch teeth on said stub shaft for engaging the clutch teeth of said coupling member, and a hand crank for rotating said stub shaft.

3. In a safety crank for explosion engines, the combination with a fixedly supported bracket, and a coupling member rotative adjacent the bracket and provided with clutch teeth and also a smooth bore, the coupling member being adapted for connection with a crank shaft, of a collar guided rotatably on said member and having ratchet teeth thereon, a dog movably supported by said bracket adjacent said collar, a spring supported by said bracket and pressing said dog into engagement with said ratchet teeth, clutch teeth on one side of said collar, a stub shaft having a cylindrical flange-like projection thereon, said shaft extending into said bore, clutch teeth on the inner end of said shaft to engage the teeth with which said coupling member is provided, clutch teeth on the inner side of said projection opposed to the teeth on said collar, clutch teeth on the outer side of said projection, a sleeve rotative on said shaft and having a flange on one end thereof, clutch teeth on said flange opposed to the teeth on the outer side of said projection, and a hand crank secured to the opposite end portion of said sleeve.

4. In a safety crank for explosion engines, the combination with a rotatable crank shaft, and a fixed support, of a stub shaft provided with clutch devices and having a cylindrical flange-like projection thereon provided with two series of oppositely facing ratchet type clutch teeth, said teeth having flattened extremities, a coupling member connected to the crank shaft and having a bore therein receiving one end of said stub shaft, said member being provided with clutch devices to be engaged by the clutch devices on the stub shaft, a collar rotatable on said coupling member, a device coöperating with said support and said collar for detachably connecting said collar to said support, ratchet type clutch teeth on said collar having flattened extremities and opposed to one of the series of clutch teeth on said projection, a sleeve rotatable on said shaft and having a flange on one end thereof, ratchet type clutch teeth on said flange opposed to the other of the two series of teeth on said projection, and a hand crank secured to said sleeve.

In testimony whereof, I affix my signature in presence of two witnesses.

WILLIAM R. CLARK.

Witnesses:
P. A. HAVELICK,
E. T. SILVIUS.

Copies of this patent may be obtained for five cents each, by addressing the "Commissioner of Patents, Washington, D. C."